April 24, 1945. R. H. LAWSON 2,374,360
POWER TRANSMITTING MECHANISM
Filed Sept. 17, 1941 2 Sheets-Sheet 2

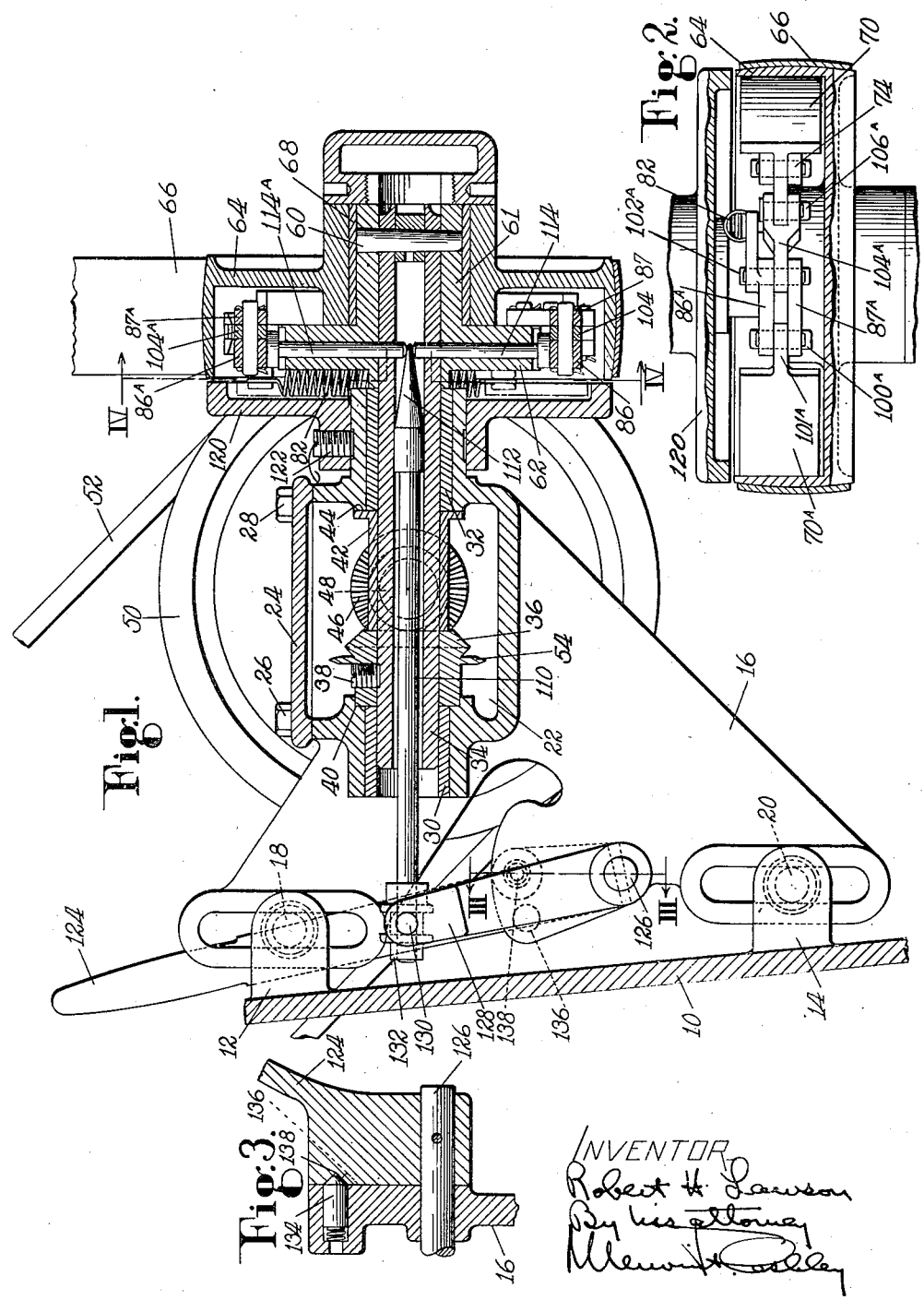

INVENTOR
Robert H. Lawson
By his attorney

Patented Apr. 24, 1945

2,374,360

UNITED STATES PATENT OFFICE 2,374,360

POWER TRANSMITTING MECHANISM

Robert H. Lawson, Beverly, Mass., assignor to United Shoe Machinery Corporation, Flemington, N. J., a corporation of New Jersey Application September 17, 1941, Serial No. 411,114

7 Claims. (Cl. 192—75)

This invention relates to such mechanism as clutches, through which power may be transmitted. It finds a useful application as a substitute for tight and loose pulleys and their associated belt-shifting mechanism.

My invention has as an object the provision of mechanism of the above-mentioned character, which is simple and compact and in which the driving forces are equalized. To this end, there is combined with a driving and a driven member, each of which is shown as a pulley, a self-energizing friction driving device, and axially movable means to render said device operative or inoperative. The driving device preferably includes a pair of symmetrical linkage systems through which power is transmitted, and symmetrical resilient members, which may consist of springs, each member being common to both linkages. More specifically, I employ an outer rotatable member and an inner rotatable member, the former having opposite carrier levers fulcrumed upon it and to which are connected opposite friction shoes arranged for engagement with the outer member. Opposite toggle levers are pivotally connected to both the inner member and to the respective shoes, while each of a pair of springs joins one of the carrier levers to one of the toggle levers, and acts to urge both shoes toward the outer member to give a self-equalizing effect.

The invention will be understood when the attached drawings are considered in connection with the following specification.

In the drawings,

Fig. 1 is a side elevation of the mechanism, partially in section;

Fig. 2 is a top view of certain of the linkages with the surrounding parts broken away;

Fig. 3 is a section on the line III—III of Fig. 1 looking in the direction of the arrows and is a detail showing the means for maintaining a controlling lever in either stopped or running position;

Figure 4:
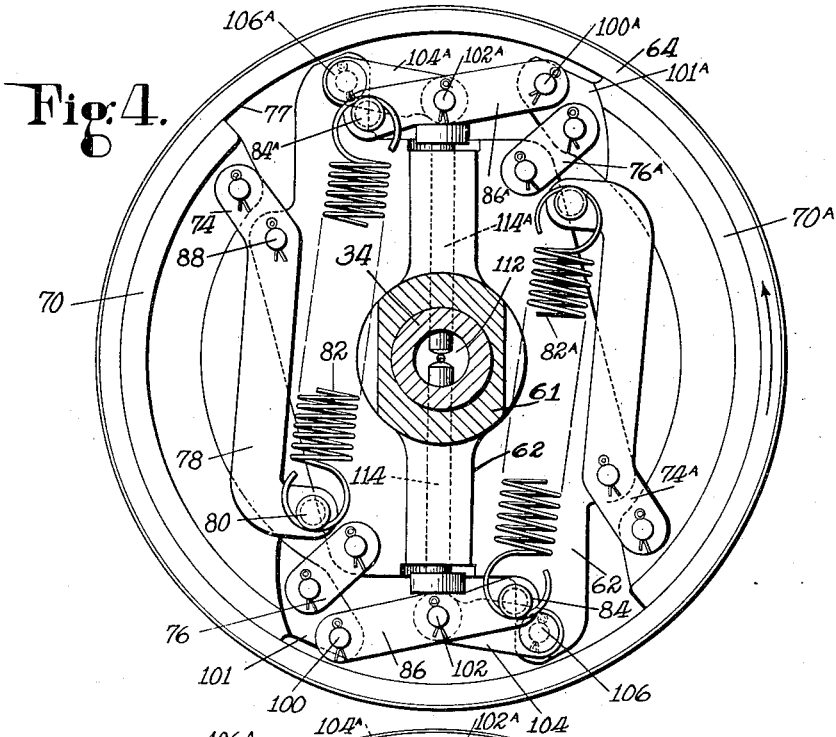
Fig. 4 is a sectional view on the line IV—IV of Fig. 1, showing in end elevation the linkages and other parts used to connect the power-receiving pulley to the mechanism for driving the machine. The parts in this view are shown in position to drive the machine.

In the drawings, 10 indicates the frame of a machine having ears 12 and 14 extending therefrom, and which may be those normally used for attaching an electric motor for driving the machine. To these ears a bracket 16 is attached by bolts 18 and 20, it carrying all the working parts of the transmitting mechanism.

The bracket 16 is provided with webs to form a lubricant holding chamber 22 which is closed by a cover plate 24 secured by bolts 26, 28. At the ends of the chamber 22 are bushings 30 and 32 in which a hollow shaft 34 is mounted for rotation. On this shaft is a beveled gear 36 held by a set screw 38. The end of the hub of the gear 36 is prevented from moving to the left (Fig. 1) by a counterbore 40 on the inside of the chamber 22 and endwise motion of the shaft and gear in the other direction is prevented by a spacing bushing 42 contacting with the gear 36 and bearing against a finished surface 44 of an internal boss in the chamber 22. The beveled gear 36 meshes with a similar gear 46 to drive a crossshaft 48 on which is mounted a pulley 50 which carries a belt 52 to drive the machine. To lubricate the moving parts in the chamber 22, the beveled gear 36 is provided with an integral disk 54 which dips and distributes lubricant partially filling the chamber 22.

Secured to the hollow shaft 34, by a taper pin 60, is the hub 61 of a carrier member 62 (Figs. 1, 4 and 5) on which member are mounted most of the operating parts of a friction clutch or mechanism by which the drive from power means to the machine belt may be connected or disconnected.

A pulley 64, driven by a belt 66 from a source of power, is rotatable on the hub 61 of the carrier member 62, a bushing 68 being interposed between the hub and the pulley 64 to reduce wear. This pulley furnishes the driving member of the clutch, the carrier 62 being the driven member. Mounted on the carrier member 62 are two identical systems of linkages for controlling two internal friction shoes 70 and 70A. (See Figs. 4 and 5.)

Describing one of those linkage systems (see Fig. 4), the shoe 70 is connected to the carrier member 62 by link 74 furnished by the short arm of a bell crank carrier lever and by a short link 76. It will be noted that, when the shoe moves in the direction of rotation (indicated by the arrow), the arm 74 and link 76 are so pivoted as to cause the shoe to move outwardly under the influence of centrifugal force and engage the inner surface 77 of the power-receiving pulley 64. After engagement has taken place, the friction thereof and the pivotal mounting cause the shoe to grip the pulley with increasing force in the well-known manner of a self-energizing brake of the kind frequently used in automobiles. In addition to the short arm 74, the carrier lever is also provided with a longer and bent arm 78, which carries, at its outer end, a pin 80 around which one end of a large tension spring 82 is hooked. The other end of the spring 82 is connected to a pin 84A mounted on a toggle link 86A which belongs to the other system of linkages and will be described later. The pull of the spring 82 turns the lever 74, 78 counterclockwise about a pin 88 mounted in the carrier member 62. This moves the shoe 70, through its additional pivotal connection with the short link 76, in the direction of the arrow and also outwardly to engage the shoe with the surface 77 of the pulley 64. This engagement maintains a connection between the pulley and carrier member 62, as seen in Fig. 4, to drive the machine from the belt 66 by way of the shaft 34, gearing 36, 46, shaft 48, pulley 50 and belt 52, until such time as the connection is released by the following mechanism.

Figure 5:
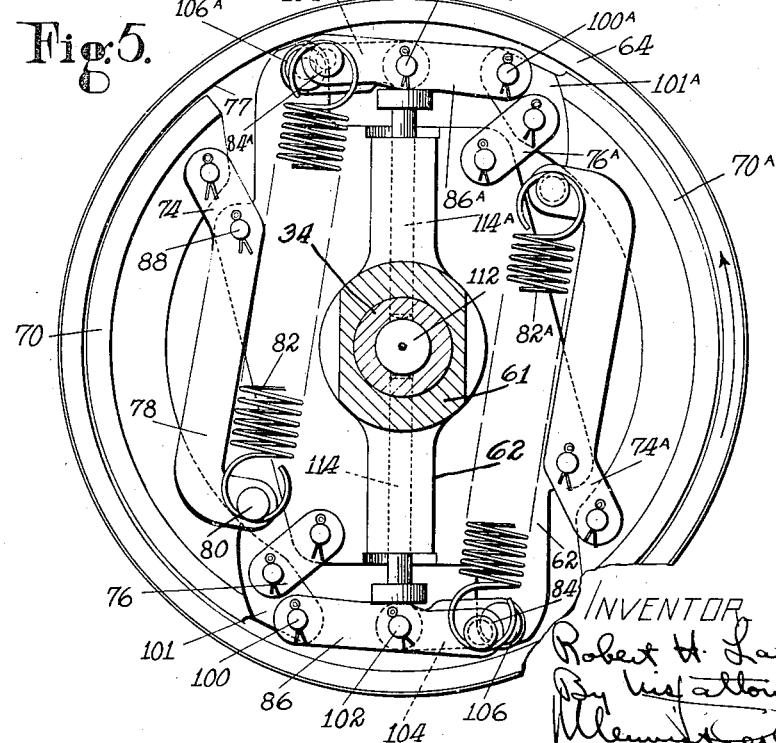
Fig. 5 is a view similar to Fig. 4 with the parts in inoperative position.

The shoe 70 is moved against the direction of rotation, to free it from the surface 77 and disconnect the driving connection, by straightening a toggle lever, which brings the linkages into the position shown in Fig. 5. This mechanism includes a toggle link 86 which is pivotally connected at 100 to a lug 101 formed on the shoe 70 near the end to which the link 76 is pivoted. This link 86 is pivotally connected at 102, near its center, to a cooperating toggle link 104 which is pivoted at 106 on the carrier member 62. The free end of the toggle link 86 has secured to it a pin 84 on which a tension spring 82A is hooked. This link 86, together with the links 74 and 76, carries the shoe 70.

For straightening the above toggle mechanism and the similar mechanism in the other linkage system, a rod 110 with a tapered end 112 (see Fig. 1) is carried by a structure to be described and is arranged to be forced axially through the hollow shaft 34 so as to come between and separate the inner ends of two plungers 114 and 114A, thus acting as a wedge to force them apart outwardly. The plungers are mounted in diametrically opposite radial bores in the carrier member 62. When these plungers 114 and 114A are separated, their outer ends bear against and straighten, respectively, the toggles 86, 104, and 86A, 104A to cause the shoes 70 and 70A to move opposite to the direction of the arrow (Fig. 5), thus separating the shoes 70 and 70A from the surface 77 and disconnecting the clutch.

In order to avoid an eccentric load on the shoe 70A when the toggle mechanism is being straightened, the pressure is applied in the median plane of the shoe by the toggle mechanism (see Fig. 2). To this end, because the main portion of the link 86A is connected on one side of the central lug 101A at the end of the shoe, a parallel link 87A is connected to the opposite side of the central lug. Similarly, the link 86 is paralleled by a link 87.

One system of linkages has been described and the other system is identical therewith, the two systems being symmetrical so that the weight of one is balanced by the weight of the other. The parts of the two systems have been given the same reference characters in the drawings with the exception that the exponent "A" has been added to the parts of the second system. It should be noted that the tension springs 82 and 82A are each common to both systems and both act resiliently through like linkages, when otherwise permitted, to cause a driving connection between the surface 77 and each of the shoes 70 and 70A. The clutching forces applied by the shoes to the outer driving member are therefore equalized. In describing the first system, it has been necessary, of course, to refer to certain parts of the other system.

It will be seen that when the end 112 of the rod 110 is disengaged from the ends of the plungers 114 and 114A, the driving connection through the unit is made by the action of the springs 82 and 82A and there is no wear on the end 112 of the pin or on the ends of the plungers 114 and 114A. Furthermore, when the end 112 does engage the plungers, the driving connection is broken by the straightening of the toggle mechanisms and the only wear that occurs is while the mechanism is coming to a stop, after which the pulley 64 continues to rotate idly.

In order to protect the operator and the two systems of linkages against injury, a guard 120 (see Fig. 1) is mounted, concentric with the hollow shaft 34, on the outer boss of the lubricant chamber 22, and it is secured thereto by a set screw 122. The outer diameter of the guard is substantially the same as that of the power-receiving pulley 64 and it is positioned with only a slight clearance between its outboard face and the inboard face of the pulley.

To make or break the driving connection through the clutch to render the connection either operative or inoperative, a shifter lever 124 is provided which turns a shaft 126 that is mounted in bearings in the bracket 16. Mounted on the shaft 126 and turning therewith is a yoke 128 carrying a pair of pins 130. These pins engage a grooved sleeve 132 secured to the rod 110. Accordingly, when the lever 124 is moved either forward or backward, it communicates a similar motion to the rod 110, causing its tapered end 112 to operate the plungers 114 and 114A and control the toggle mechanism as previously described. When the handle is moved to the left in Fig. 1, the clutch is engaged and when it is moved in the opposite direction, said clutch is disengaged and the driving of the machine is stopped.

To maintain the shifter lever 124, and its connected yoke 128, in either of these positions, a spring detent plunger 134 is provided (see Fig. 3). The end of the plunger presses into either one of two recesses 136, 138 thus retaining the shifter lever 124 in either one of the two positions.

Having thus described my invention, what I claim is new and desire to secure by Letters Patent of the United States is:

1. In combination, a rotatable member having an engaging face, a rotatable carrier member, a movable shoe, pivotally mounted links joining the opposite ends of the shoe to the carrier member, toggle mechanism between the shoe and the carrier member, resilient means acting to move the shoe toward said engaging face and circumferentially in a direction to cause self-energizing engagement of the shoe with said face, and axially movable means for rendering said shoe operative or inoperative to transmit power between the members.

2. In combination, a rotatable driving member having an engaging face, a rotatable carrier member, a pair of shoes movable upon one of the members for engagement with the other, symmetrical systems of linkages mounted on the carrier member and by which the shoes are respectively carried, a pair of symmetrical resilient members, each of said resilient members being common to both systems of linkages and adapted to cause the engagement of the shoes, a pair of toggle mechanisms for rendering said resilient members effective or ineffective, radially movable plungers mounted in bores in the carrier member, each plunger controlling a toggle mechanism, and an axially tapered member movable between said plungers to separate them and straighten the toggle mechanisms to render the linkages ineffective for the transmission of power.

3. A power-transmission unit having in combination, a shaft, a carrier member secured to the shaft, a power-receiving pulley freely mounted on the carrier member and co-axial therewith, a shoe-engaging face on the pulley, a movable shoe, pivotally mounted links and a toggle mechanism connecting the shoe and the carrier member, resilient means acting to move the shoe toward said face of the pulley and circumferentially of the direction of its rotation to cause self-energizing engagement of the shoe with said face, a radially movable plunger mounted in a bore in the carrier member, radial movement of the plunger in one direction straightening the toggle mechanism to move its connected shoe radially away from the power-receiving pulley and circumferentially against its direction of rotation to separate the shoe from the pulley and prevent transmission of power through the unit, and operator-controlled means for controlling the plunger.

4. A power-transmission unit having in combination, a hollow shaft, a carrier member secured to the shaft, a power-receiving pulley freely mounted on the carrier member and co-axial therewith, a shoe-engaging face on the pulley, a plurality of movable shoes, pivotally mounted links and toggle mechanisms between the shoes and the carrier member, resilient means acting to move the shoes toward said face of the pulley and circumferentially in the direction of its rotation to cause self-energizing engagement of the shoes with said face, radially movable plungers mounted in bores in the carrier member, radial movement of each plunger in one direction straightening its associated toggle mechanism to move its connected shoe radially away from the power-receiving pulley and circumferentially against its direction of rotation to separate each of said shoes from the pulley and prevent transmission of power through the unit, and means movable within the shaft for controlling the plungers.

5. In combination, a rotatable driving member having an engaging face, a rotatable carrier member, a plurality of movable shoes, pivotally mounted links and toggle mechanisms between the shoes and the carrier member, plungers for engagement with the centers of the toggles, yielding means acting on the toggles and links to bring the shoes into engagement with the face of the driving member when the plungers are in one position, and positive means for moving the plungers against the toggles to render said yielding means ineffective.

6. In a clutch, a rotatable outer member, a rotatable inner member, opposite carrier levers fulcrumed upon the inner member, opposite friction shoes connected to the respective carrier levers and arranged for engagement with the outer member, opposite toggle levers pivotally connected to the inner member and to the respective shoes, and opposite springs, each spring joining one of the carrier levers to one of the toggle levers and acting to urge both shoes toward the outer member.

7. In a clutch, a rotatable outer member, a rotatable inner member, opposite carrier levers fulcrumed upon the inner member, opposite friction shoes connected to the respective carrier levers and arranged for engagement with the outer member, opposite toggle levers pivotally connected to the inner member and to the respective shoes, opposite springs, each spring joining one of the carriers levers to one of the toggle levers and acting to urge both shoes toward the outer member, and means acting upon both sets of toggle levers for overcoming the force of the springs and retracting the shoes.

ROBERT H. LAWSON.